Filed Feb. 4, 1966, Ser. No. 525,026
11 Claims. (Cl. 338—309)

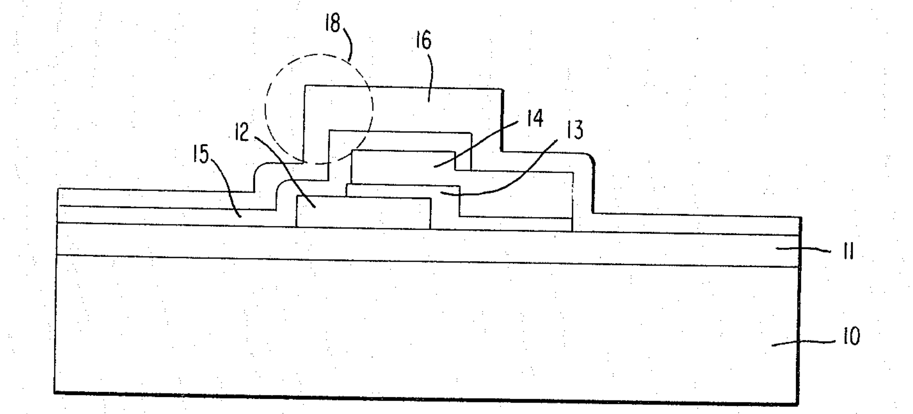
INVENTORS
MAX J. SCHULLER
MICHAEL J. URBAN
ERWIN F. LITTAU
BY Sughrue, Rothwell, Mion, Zinn & Macpeak
ATTORNEYS 3,381,256
RESISTOR AND CONTACT MEANS ON A BASE Max J. Schuller, Palo Alto, Calif., and Michael J. Urban, Stamford, and Erwin F. Littau, Norwalk, Conn., assignors, by mesne assignments, to Monsanto Company, St. Louis, Mo.

The present invention relates to a method for producing reliable contacts between thin films of high resistivity material and relatively thick films of low resistivity material over which the thin film element is deposited.

According to well known practice, electrical devices may be produced by building into a body of semiconductor material, such as a silicon wafer, various semiconductor devices, such as transistors, and other passive components, such as diodes, capacitors, resistors and the like. Such devices are commonly produced by processes of epitaxial growth, diffusion and alloying. A passivating layer of silicon dioxide is ordinarily grown on the surface of the semiconductor body.

Next, various thin film electrical components, such as thin film resistors are deposited on the surface of the silicon oxide layer. Then contacts or terminals are applied to the electrical component and the entire device is coated with a protective film, such as silicon monoxide.

In working with the resulting monolithic semiconductor circuits, it soon became abvious that such techniques resulted in devices in which the resistors were inferior to standard components with respect to temperature coefficient, tolerances, stray capacitance, etc.

In order to overcome the problems encountered in making such devices, a process and product have been developed as described in our copending application Ser. No. 525,020, filed Feb. 4, 1966, for "Method for Applying Thin Film Components to Semiconductors," by M. J. Schuller, E. F. Littau and M. J. Urban. The process comprises first depositing a relatively thick layer of a low resistivity electrical contact material directly on the semiconductor body or on the passivating layer which envelopes the semiconductor wafer or chip. One or more layers of bonding metal are then deposited over at least part of hte contact layer. Next, the thin film resistor is deposited over the contact layer and the intermediate film of bonding metal. Substantially immediately thereafter, an outer protective film is deposited over the thin film resistor to protect it from contamination and degradation.

Although substantial improvement in device properties is realized by such a procedure, it has been found that there is still a high incidence of failure in the resistor elements. In particular, it has been found that during operation of the resistor failure occurs at the point where the thin film element passes over the sharp edge of the relatively thick layer or film of low resistivity material. This problem, referred to as "burnt out," indicates that conventional bonding procedures and materials, generally comprising interposing a film of gold or other noble metals, are inadequate to provide reliable contacts between thin film resistors and relatively thick low resistivity films over which they are deposited.

Therefore, the primary object of the present invention is to provide reliable electrical contacts between such films.

In accordance with the present invention, it has now been found that the problem of burn out between a thin film resistor and a relatively thick, low resistivity film can be overcome by depositing a first bonding layer of a suitable metal underneath the low resistivity film. Examples of some suitable metals are chromium, nickel, gold, platinum and alloys thereof.

The nature of the present invention will be more fully appreciated in the light of the following detailed description of a preferred embodiment considered with reference to the accompanying drawing.

In the drawing, the single figure is a greatly enlarged side, cross-sectional view of a portion of a device incorporating the present invention.

Referring to the drawing, substrate or base 10 is a semiconductor body, such as silicon, in which various active and passive components may have been produced by standard procedures of alloying, diffusion and the like. Silicon is preferred, but other semiconductor materials such as germanium and a III–V compounds may be used. A passivating dielectric layer 11, usually grown silicon dioxide, ordinarily covers the surface of semiconductor wafer 10. Wafer 10 and dielectric film or layer 11 together form a passivated semiconductor body, the specific materials not being critical. The passivating film should be smooth and free from pinholes so that any of the layers subsequently deposited upon it are smooth and firmly bonded and so that there is no undesired electrical contact with the semiconductor substrate.

A moderately thick layer of low resistivity metal 12 is evaporated onto the surface of passivating layer 11. Nickel-chrominum alloys are the preferred metals for this low resistivity film, although other metals may be used.

Next, a thin film of chrominum 13, or other suitable metal, is evaporated over part of the intermediate layer 12, overlapping on part of the passivating layer 11. A film of a noble metal 14, preferably gold or a noble metal alloy is then deposited over at least a portion of the surface of the surface of the chromium film 13.

The chromium layer 13 serves as a bonding layer for the relatively thick noble metal layer 14 which serves as a conductive path.

After deposition of bonding layers 13 and 14, an electrical component 15, which may be a thin film resistor, is deposited over the noble metal film 14, and the intermediate layer 12 respectively. Nickel-chrominum alloys are the preferred materials for the thin film resistor.

After deposition of the thin film resistor 15, a dielectric protective layer 16, preferably of silicon monoxide is deposited over the resistive film. Other dielectirc materials would be satisfactory.

It will now be apparent that a reliable current conducting path has been formed from the resistive layer 15, to the conductive layer 14, via the intermediate layer 12.

It is believed that the problem of "burn out" occurs where the thin film passes over the edge 18 of the relatively thick film of low resistivity material. Therefore, films 13 and 14 are applied so that they are recessed from the low resistivity film 12.

In the structure shown in the drawing, low resistivity film 14 provides one contact of the resistor element. Other contacts may be provided to the thin film resistor to complete the structure.

It should also be understood that the film 14 may, at some point, be in contact with the underlying semiconductor, with other film elements on the surface of the semiconductor body or with external circuits. Therefore, film 14 may be in direct contact with the semiconductor material and/or the passivating film.

The configuration of the thin film resistor and the interconnection patterns of bonding metals are outlined on the surface of the passified semiconductor wafer using conventional procedures, such as the application of a photoresist material followed by exposure and development in the normal manner. The contact material, bonding metals, thin film resistor, and protective film may all be deposited by convention procedures, such as vacuum evaporation techniques. The contact and the resistor may be conventional materials used for this purpose.

For example, the evaporation of the various films may be carried out in a commercial vacuum system capable of holding a pressure of $10^{-4}$ mm. mercury during deposition and having provision for glow discharge cleaning of the substrate with uniform current density.

Where nickel-chrominum alloys of the same composition are employed for both the intermediate resistivity film 12 and the thin film resistor 15 the contact layer will necessarily be relatively much thicker than the thin film resistor so as to provide a sufficiently conductive path. For example, the contact layer 12 might be in the range of from 2000–3000 A., and the thin film resistor from 50 to 100 A. thick.

In carrying out a preferred embodiment of the invention, a silicon wafer containing one or more active semiconductor or passive elements is provided with a passivating film of silicon dioxide, 5000 A., and is introduced into a vacunum chamber in which the pressure is reduced to about $10^{-4}$ mm. of mercury. An intermediate layer of nickel-chrominum alloy is then evaporated through a suitable mask, such as a layer of photoresist material, onto selected portions of the substrate. The evaporation may be made from a resistance heated source, but may also be made by any other suitable vacuum deposition procedure. The evaporation is terminated as soon as a nickel-chrominum film of sufficiently low resistivity is deposited, for example, about 100 ohms per sq. which corresponds to a transmission of about 22%.

The wafer is then cooled to about 260° under vacuum. The vacuum chamber is then filled with dry nitrogen gas until the pressure is reduced to atmospheric. When the temperature falls below about 200° C., the wafer is removed from the chamber, the masking material is removed, and a new mask is applied for the evaporation of the bonding metals 13 and thick conductive layer 14.

The wafer is then returned to the vacuum chamber and a thin film of chromium about 100 A. thick is deposited over the nickel-chrominum film. A film of gold is then vacuum deposited over the chromium film. A thickness of about 3000 A. is suitable for the gold layer.

The water is then cooled as before and removed from the vacuum chamber and the mask replaced with another mask suited to the deposition of the thin film resistor elements and the dielectric layer 16 of desired configuration. The wafer is returned to the vacuum chamber and a thin film of a nickel-chromium alloy is deposited through the mask onto the gold film. The thickness of the film may be controlled by monitoring both transmission and sheet resistance of the deposit during the evaporation. At the required thickness the evaporation is stopped. Sheet resistance of from 10 ohms per sq. to 200 ohms per sq. have been achieved by this technique for nickel-chromium resistive materials.

Substantially immediately after the evaporation of the nickel-chromium resistor layer has been terminated, a silicon monoxide film is deposited by evaporation over the entire device to seal in the resistor and the bonding and contact films.

In this manner, stable and reliable contacts are formed between the thin film resistor and the underlying relatively thick low resistivity film by virtue of the intermediate chrominum films.

It will be obvious to those skilled in the art that various changes may be made in the materials and procedures described in the present specification without departing from the scope or spirit of the present invention as expressed in the following claims.

What is claimed is:

1. In an electrical device including a thin film resistor and a relatively thick, low resistivity film over which said thin film resistor is deposited, an improved contact between said resistor and said low resistivity film comprising a film of chromium deposited on at least a portion of the surface of said low resistivity film and a film of a noble metal deposited on at least a portion of the surface of said chromium film, the thin film resistor being deposited over said noble metal film to form good electrical contact with said low resistivity film through said noble metal and said chromium films.

2. An electrical device, according to claim 1 wherein said low resistivity film is a nickel-chromium alloy.

3. An electrical device, according to claim 1 wherein said thin film resistor is a nickel-chromium alloy.

4. An electrical device, according to claim 1 wherein said noble metal film is a gold film.

5. An electrical device, according to claim 1 wherein said chromium and noble metal films are applied so that the chromium film overlaps at least one edge of said low resistivity film, and said noble metal film overlaps the same edge of the chromium film.

6. An electric device comprising a passivated semiconductor wafer, a relatively thick low resistivity film deposited on at least a portion of said wafer, a film of chromium metal deposited on at least a portion of said low resistivity film, a film of a noble metal deposited on at least a portion of said chromium film, and a thin film resistor element deposited on at least a portion of said noble metal film, said chromium and noble metal layers together forming a reliable contact between said film resistor and said low resistivity film.

7. The device according to claim 6 wherein said chromium and noble metal films are applied so that the chromium film overlaps at least one edge of said low resistivity film, and said noble metal film overlaps the same edge of the chromium film.

8. The device according to claim 6 further comprising a film of protective material deposited on the surface of said thin film resistor.

9. The device according to claim 6 wherein said low resistivity film is a nickel-chromium alloy.

10. The device according to claim 6 wherein said thin film resistor is a nickel-chromium alloy.

11. The device according to claim 6 wherein said noble metal film is a gold film.

References Cited

UNITED STATES PATENTS

| | | | |
|---|---|---|---|
| 2,758,256 | 9/1956 | Eisler | 338—309 X |
| 3,256,587 | 6/1966 | Hagstefer | 317—101 |

DARRELL L. CLAY, *Primary Examiner.*

E. GOLDBERG, *Assistant Examiner.*